United States Patent [19]

Smith et al.

[11] Patent Number: 4,564,910
[45] Date of Patent: Jan. 14, 1986

[54] METHOD AND ALGORITHMS THEREFORE FOR MONITORING THE PERFORMANCE OF A TOOL AND MODIFYING THE FEED RATE THEREOF

[75] Inventors: Stanley K. Smith; Donald J. Rozsi, both of Fenton, Mich.

[73] Assignee: Eaton Corporation, Cleveland, Ohio

[21] Appl. No.: 488,322

[22] Filed: Apr. 25, 1983

[51] Int. Cl.$^4$ .............. G06F 15/20; G06G 7/48; G01N 19/02
[52] U.S. Cl. .................. 364/474; 364/475; 364/550; 364/551; 364/577; 73/104; 340/679
[58] Field of Search .............. 364/474, 475, 550, 551, 364/577, 185, 573; 340/679; 73/104; 318/332, 569

[56] References Cited

U.S. PATENT DOCUMENTS

| | | | |
|---|---|---|---|
| 3,596,544 | 8/1971 | Pitman | 82/1 R |
| 3,699,318 | 10/1972 | Underkoffler et al. | 364/573 X |
| 3,715,946 | 2/1973 | Kaltenbach | 83/72 |
| 3,834,615 | 9/1974 | Watanabe et al. | 235/151.11 |
| 3,836,834 | 9/1974 | Abbatiello | 318/563 |
| 4,207,567 | 6/1980 | Juengel et al. | 340/680 |
| 4,237,408 | 12/1980 | Frecka | 318/571 |
| 4,260,986 | 4/1981 | Kobayashi et al. | 340/680 |
| 4,322,669 | 3/1982 | Fukuma et al. | 318/332 X |
| 4,326,257 | 4/1980 | Sata et al. | 364/508 |

Primary Examiner—Jerry Smith
Assistant Examiner—Charles B. Meyer
Attorney, Agent, or Firm—C. H. Grace; M. L. Union

[57] ABSTRACT

A method of monitoring the performance of a tool which moves relative to a workpiece through a cycle and controlling the feed rate between the tool and the workpiece includes the steps of dividing the cycle into a plurality of increments, sensing a function of force applied to the tool during the increments, determining a mathematically smoothed function of force for the function of force for each sensed individual increment of the cycle and establishing a reference for the mathematically smoothed function of force for each of the sensed increments. The actual determined sensed mathematically smoothed function of force for a particular increment is compared with the established reference for that particular increment and a first signal is generated if the actual determined mathematically smoothed function of force deviates from the established reference. The feed rate between the tool and workpiece is modified in dependence upon the first signal.

30 Claims, 8 Drawing Figures

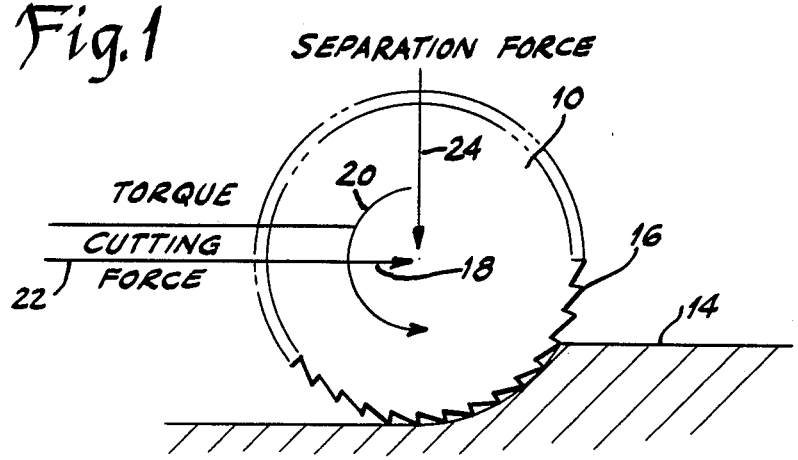
Fig. 1
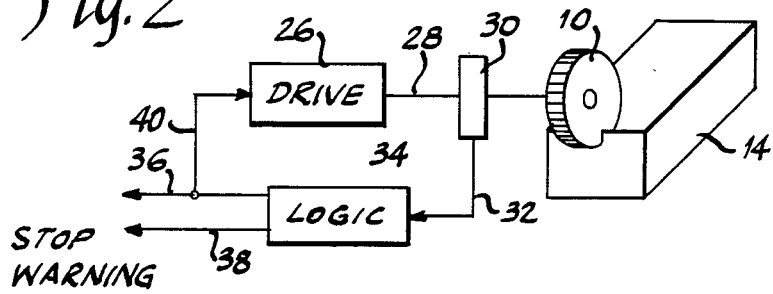
Fig. 2
Fig. 3
| CPD CYCLES (N) | TORQUE (P) | AVG. TORQUE (CA) | DIFFERENTIAL ($\delta_i$) | DEVIATION RATIO ($|\Delta i|$) | PERCENT DEVIATION ($|\Delta i \%|$) | CUMULATIVE % DEVIATION (CPDI) |
|---|---|---|---|---|---|---|
| 1 | 10 | 10.0 | 0 | 0 | 0 | 0 |
| 2 | 10 | 10.0 | 0 | 0 | 0 | 0 |
| 3 | 11 | 10.3 | 0.667 | 0.0645 | 6.45 | 6.45 |
| 4 | 10 | 10.2 | 0.250 | 0.0244 | 2.44 | 8.89 |
| 5 | 11 | 10.4 | 0.600 | 0.0576 | 5.77 | 14.7 |
| 6 | 11 | 10.5 | 0.500 | 0.0476 | 4.76 | 19.5 |
| 7 | 12 | 10.7 | 1.29 | 0.120 | 12.0 | 31.5 |
| 8 | 13 | 11.0 | 2.00 | 0.182 | 18.2 | 49.7 |
| 9 | 16 | 11.6 | 4.44 | 0.383 | 38.3 | 88.0 |
| 10 | 16 | 12.0 | 4.00 | 0.333 | 33.3 | 121.3 |

METHOD AND ALGORITHMS THEREFORE FOR MONITORING THE PERFORMANCE OF A TOOL AND MODIFYING THE FEED RATE THEREOF

BACKGROUND OF THE INVENTION

1. Field of the Invention

The present invention relates to a method of monitoring the performance of a working tool and more particularly, to a method of monitoring the performance of a working tool by sensing the force or a function of the force applied to the tool and determining a mathematically smoothed function of force such as cumulative percentage deviation for each sensed force reading and utilizing the cumulative percentage deviation data points to determine whether the tool is functioning properly and to control the feed rate between the tool and workpiece to insure that the tool is performing properly.

Methods of monitoring tool wear are well-known in the prior art. Such known methods include monitoring torque, power, current, and pressure to determine whether a tool is functioning properly. The known methods of tool monitoring do not provide the degree of reliability which is necessary in an industrial environment. The present invention attempts to overcome the prior art disadvantages by providing a new and improved method of monitoring the performance of a cutting tool by utilizing an established trend in cumulative percentage deviation (CPD) data points. Prior art such as the Forath U.S. Pat. No. 3,545,310 discloses a tool wear sensor which among other things utilizes the torque gradient to determine tool wear. Watanabe U.S. Pat. No. 3,834,615 also discloses measuring various forces and utilizing a torque gradient to measure tool wear. Tsukava U.S. Pat. No. 4,090,403 and Frecka U.S. Pat. No. 4,237,408 discloses other tool monitoring systems which sense torque and/or power. Other known methods of monitoring tools include monitoring the cumulative percentage deviation of the torque associated with a cutting tool and establishing a high limit against which the cumulative percentage deviation is compared and the machine is shut down if the high limit is reached.

SUMMARY OF THE INVENTION

The present invention provides a new and improved method of monitoring the performance of a tool which moves relative to a workpiece through a cycle and controls the feed rate between the tool and workpiece. The method includes the steps of dividing the cycle into a plurality of increments, sensing a function of the force applied to the tool during the increments, determining a mathematically smoothed function of force for the sensed function of force for each sensed individual increment, establishing a reference for the mathematically smoothed function of force for each increment, comparing the actual determined sensed mathematically smoothed function of force for a particular increment with the established reference for that particular increment, generating a first signal if the actual determined mathematically smoothed function of force deviates from the established reference and modifying the feed rate between the tool and workpiece in dependence upon the first signal.

Another provision of the present invention is to provide a new and improved method of monitoring the performance of a tool as set forth in the preceding paragraph wherein the mathematically smoothed function of force is a cumulative percentage deviation.

Still another provision of the present invention is to provide a new and improved method of monitoring the performance of a tool as set forth in the preceding paragraph wherein the step of establishing a reference for the mathematically smoothed function of force includes the step of establishing an acceptable range for the determined mathematically smoothed function of force for each sensed individual increment.

Another provision of the present invention is to provide a new and improved method of monitoring the performance of a tool as set forth hereinabove wherein the step of establishing a reference for the mathematically smoothed function of force includes the step of establishing an optimum mathematically smoothed function of force for each sensed individual increment.

A still further provision of the present invention is to provide a new and improved method of monitoring the performance of a tool which moves relative to a workpiece as set forth hereinabove wherein the step of establishing a reference for the mathematically smoothed function of force includes the step of establishing an optimum acceptable range for the gradient of the mathematically smoothed function of force.

A still further provision of the present invention is to provide a new and improved method of monitoring the performance of a tool as set forth hereinabove wherein the step of establishing a reference for the mathematically smoothed function of force includes the step of establishing an optimum gradient for the mathematically smoothed function of force.

DESCRIPTION OF THE DRAWINGS

FIG. 1 is a schematic illustration of a working tool acting on a workpiece.

FIG. 2 is a schematic diagram of an apparatus for driving and monitoring a working tool as it moves relative to a workpiece.

FIG. 3 is a table illustrating sensed torque data and the determination of the absolute value of the cumulative percentage deviation data points.

DESCRIPTION OF THE PREFERRED EMBODIMENT

Figure 4:
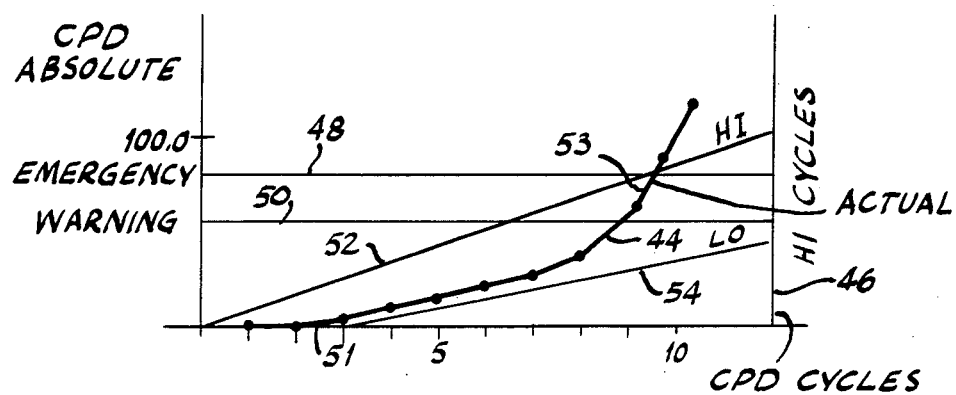
FIG. 4 is a graphical representation of the data points of FIG. 3 showing cumulative percentage deviation absolute plotted against cumulative percentage deviation cycles and illustrating a high and low limit for the cumulative percentage deviation data points.

Referring to FIG. 1 a working tool such as a cutting tool 10 is schematically illustrated as cutting into a workpiece 14. The cutting tool 10 includes a plurality of teeth 16 on the outer periphery thereof which contact and remove material from the workpiece 14 when the tool 10 is driven about an axis of rotation 18. The present invention contemplates sensing various forces or force related functions associated with the cutting tool 10 to determine whether the cutting tool 10 is properly cutting the workpiece 14.

The cutting tool 10 can be instrumented to provide an indication of the torque, separation force, feed force, cutting force and/or other force related functions associated with tool 10. The torque, schematically illustrated by the arrow 20 in FIG. 1, is the rotational force of the circular motion of the part or cutting tool as it rotates about the axis 18. The cutting force, schematically illustrated by the arrow 22 in FIG. 1, is equivalent to the thrust or the force which is required to push the tool 10 into the material 14 to be cut. The separation force, which is schematically illustrated by the arrow 24 in FIG. 1, is the force which is required to hold the tool 10 in position to keep the tool 10 at the proper depth with respect to the workpiece 14. The feed force, which is not illustrated, would be the force associated with a cutting tool, such as a drill, which is required to move the drill into the workpiece in a direction parallel to the axis of rotation of the drill. For a cutting tool such as a lathe, the feed force would be the force required to feed the workpiece in a linear direction into the cutting tool parallel to the axis of rotation of the workpiece. For planers, shapers, broaches, grinders and extruders, the feed force would be that required to effect relative linear movement between the tool and workpiece as the tool operates on the workpiece. While the present invention will be described as sensing the torque associated with working tool 10, it should be appreciated that other forces such as separation force, cutting force, feed force, pressure, thrust or other force related functions could be utilized to provide an indication of tool wear or breakage in the present invention. Thus, it is applicant's intention that the terms torque, cutting force, separation force, feed force, thrust and force be used interchangeably throughout the present application and claims and that sensing of torque or force also includes the sensing of these and other various force related functions.

Referring to FIG. 2 a system for driving the cutting tool 10 relative to the workpiece 14 is illustrated. The system includes a drive 26 which effects rotation of a shaft or spindle 28 which supports the cutting tool 10 for rotation therewith in a well-known manner. While the cutting tool 10 is described as rotating it should be appreciated that only relative motion is required between the cutting tool 10 and workpiece 14 and that the workpiece 14 could rotate relative to the cutting tool or could move relative there to in a linear fashion such as in broaching, grinding, extruding, planing or shaping.

Means are provided for measuring the force or torque applied by the drive 26 to the cutting tool 10 and workpiece 14. In the preferred embodiment, the force measurement is effected by a torque transducer 30 which is utilized to sense the torque appled by the spindle 28 to the tool 10. However, it should be appreciated that separation force, feed force, thrust or other force related measurements as set forth hereinabove could be utilized to provide a torque or force signal for the present invention. The torque transducer establishes a signal on line 32 which is directed to a logic circuit 34 for controlling the drive 26.

The logic circuit 34 is operable to process the torque signal on line 32 to determine whether the cutting tool 10 is functioning properly. The logic circuit 34 can determine whether the cutting tool 10 is not functioning properly and can additionally indicate when the cutting tool is dulling and approaching a time when it must be replaced. The logic circuit 34 is operable to establish a signal on output line 36 to shut down drive 26 whenever a broken or non-properly functioning tool 10 is sensed. The logic circuit 34 is operable to establish a warning output signal on line 38 indicative of a worn tool which needs to be changed in the near future. In addition, the logic circuit 34 is operable to establish an output on line 36 which is directed to the drive circuit 26 to modify the feed rate between the workpiece 14 and cutting tool 10 or the relative rotation between the workpiece 14 and cutting tool 10 in response to the logic circuit 34 determining that the tool 10 is not functioning optimumly.

The present invention contemplates monitoring tool wear by tracking a mathematically smoothed sensed function of force. Various mathematical algorithms could be used to mathematically smooth the sensed function of force. While cumulative percentage deviation (CPD) is disclosed as the preferred embodiment, it should be realized that other algorithms for smoothing data could also be used.

The cumulative percentage deviation calculation is a smoothing technique used to resolve a progressive trend from noisy and/or non-relevant data. A cumulative percentage deviation data point is calculated by computing an average analog signal for a tracking parameter related to force for each increment of a cycle between the workpiece 14 and the tool 10. Each cycle is divided into a plurality of increments. A cycle increment may be indicative of a single revolution of the tool 10 or a plurality of revolutions of the tool 10. If a plurality of revolutions is defined as a cycle increment, the plurality of revolutions may be the number of revolutions necessary to complete a part to be machined or may be a percent of a machining cycle for a part, such as one-half or one-third of a machining cycle for a part. An angle-encoder or rotation counter can be incorporated in the torque transducer 30 to establish signals on line 32 to the logic circuit 34 indicative of cycle increments. While a single or a plurality of rotations of the tool 10 has been utilized as a cycle increment in the preferred embodiment, it should be realized that the cycle could be broken into time or distance increments rather than angle increments. For example, in broaching, a LVDT (linear variable differential transformer) could be utilized to divide a cycle into a plurality of distance increments based on the relative linear movement between the broach and the workpiece.

A cumulative percentage deviation data point indicative of the average of the force related function sensed during an increment will be determined for each cycle increment. For example, if an increment is defined as one-third of a cycle for machining a part, then a function of force such as torque may be sensed a plurality of times during each one-third cycle and the average of the sensed torque for each one-third cycle will be used to determine the cumulative percentage deviation data point for that particular one-third cycle.

To monitor cumulative percentage deviation, a tracking parameter P must be estabished. The tracking parameter P in the preferred embodiment is torque. However, as previously indicated separation force, feed force cutting force (thrust), pressure or other force related functions could be utilized as the tracking parameter P.

A cumulative percentage deviation data point is calculated by computing an average analog signal for each increment detected by the rotation counter included in the transducer 30 and using that average value in the following calculations;

Tracking Parameter = $P$

Cumulative Average = $(CA)_i = \sum_{i=1}^{i=n} Pi/n$

Differential (Magnitude) = $|\delta i| = |Pn - (CA)_{n-1}| = \left| Pn - \left( \sum_{i=1}^{i=n-1} Pi/n - 1 \right) \right|$ Deviation (Ratio) = $\frac{|\delta i|}{(CA)_{n-1}} = \frac{|\delta n|}{(CA)_{n-1}} = |\Delta i| = \frac{\left| Pn - \left( \sum_{i=1}^{i=n-1} Pi/n - 1 \right) \right|}{\left( \sum_{i=1}^{i=n-1} Pi/n - 1 \right)} = \left| \frac{Pn}{\left( \sum_{i=1}^{i=n-1} Pi/n - 1 \right)} - 1 \right|$ Percent Deviation = $|\Delta i| \times 100 = |\Delta i\,(\%)|$ Cumulative Percentage Deviation = $|(CPD)_i| = \sum_{i=2}^{i=n} |\Delta i\,(\%)|$ where:

(i) designates the sequential values of terms in the equations.

(n) designates the Part Number or the sequential number of a data window where there should be more than one window in machining a part.

(P) in the preferred embodiment is torque.

(CA) in the preferred embodiment is average torque.

($|\delta i|$) in the preferred embodiment is torque differential from the mean.

($|\Delta i|$) in the preferred embodiment is deviation ratio of the torque deviation from the mean.

($|\Delta i\%|$) in the preferred embodiment is percent of $\Delta i$.

($|CPD|$) in the preferred embodiment is accumulation of percentage deviation ratios.

It should be appreciated that the equations for differential/magnitude and deviation/ratio are discontinuities at the first part since both must be equal to zero and the terms (N-1) in both of these equations could be changed to (N) with no significant change in final results, and there would be no discontinuity at the first part.

Figure 6:
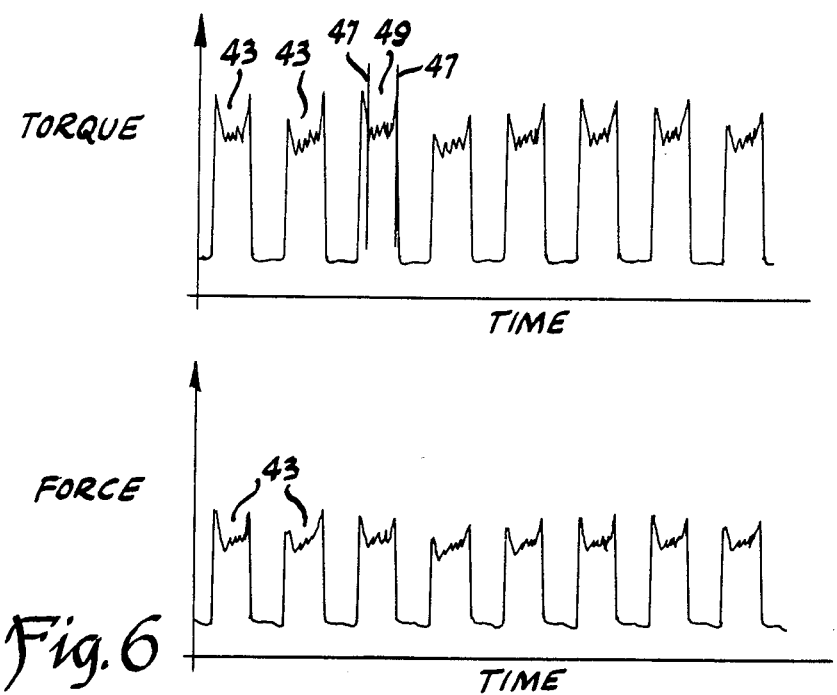
FIG. 6 is a graphical illustration of torque and force readings sensed during the machining of a plurality of individual parts.

FIG. 6 illustrate the sensed force and torque for a plurality of parts being machined. The force and torque associated with machining each part is indicated at 43. In order to accumulate significant data from the torque curve in FIG. 6, the front and end spikes 47 are filtered from each curve indicative of an individual part. The central portion of each curve 49 is divided into thirds and a cumulative percentage deviation data point is determined for each third of each central portion 49 of each signal 43. The cumulative percentage deviation data points are the utilized to plot the CPD signature such as illustrated in FIG. 4.

FIG. 3 illustrates the determination of cumulative percentage deviation data points for 10 cumulative percentage deviation cycles (CPD cycles). First, a torque sample or other tracking parameter P is sensed during each cumulative percentage deviation cycle. Using the torque sample, a cumulative average is determined by adding the torque sample to the sum of all previous torque samples and dividing by the sample size. From the cumulative average, a differential is determined by computing the difference between the torque sample and the cumulative average. This differential is then made into an absolute value as change in the cumulative average represents wear on the cutting tool which is accumulative and should be added. The deviation ratio is then determined by taking the ratio of the differences of the torque sample from the average and dividing by the cumulative average. Multiplying the deviation ratio by 100% results in a percentage deviation of the torque sample from the cumulative average. Finally, the absolute cumulative percentage deviation is determined by adding the percentage deviation data point to the previous cumulative percentage deviation data point. Each data point is indicative of a percentage deviation of a particular data point relative to the previous average of the cumulative percentage deviation data points.

The cumulative percentage deviation data points (or other mathematical smoothing formula) can be utilized to form a signature for the tool 10 by plotting cumulative percentage deviation absolute versus cumulative percentage deviation cycles as illustrated in FIG. 4. The signature can then be utilized to determine when a tool 10 is not operating properly such as when the tool 10 is broken or worn or such as when the tool encounters an unusually hard or soft part. The actual cumulative percentage deviation signature indicated at 44 in FIG. 4 is a plot of the cumulative percentage deviation, absolute, as determined from the data in FIG. 3.

The cumulative percentage deviation signature is continued from one machining cycle to the next until such time as the logic 34 determines that the tool 10 should be changed or the operator determines that the tool should be changed no matter what the cumulative percentage deviation signature looks like. An upper limit of machining cycles, indicated as high cycles at 46 in FIG. 4, is determined and is a built in safeguard against possible undetected excessive wear or breakage of the tool 10. Whenever the high cycle limit 46, is reached, a signal will be established on output line 36 of logic 34 to shut down drive 26. An emergency limit, indicated at 48, is provided to establish an output signal on line 36 whenever the emergency limit 48 is exceeded by the cumulative percentage deviation absolute to stop drive 26. A warning limit 50, less than the emergency limit 48, is also provided and is indicative that the cumulative percentage deviation absolute data points are approaching the emergency limit 48. The warning limit 50 allows the machine operator to prepare to change tools or to prepare to shut down the machine prior to the emergency limit 48 being reached. This will provide for less shut down time during tool change over because the operator can prepare prior to the shut down. The cumulative percentage deviation warning limit 50 defines the point at which an amount of degradation of a tool is detected to be great enough that the tool should be changed in the near future. The cumulative percentage deviation emergency limit 48 defines the point at which the amount of degradation of the tool detected is so great that the tool must be changed immediately to avoid destroying the tool or the parts to be cut by the tool.

It has been found that the cumulative percentage deviation signature can be utilized to sense degradation of a tool over a plurality of work cycles. The logic 34 is operable to sense a trend in the actual cumulative percentage deviation data points 44. In the preferred embodiment, the trend is a substantially linear trend of the cumulative percentage deviation signature and the logic 34 senses the gradient of the cumulative percentage deviation signature. However, it should be appreciated that other than linear trends could be determined by experimentation. The logic 34 is operable to sense a change in the gradient of the cumulative percentage deviation signature 44. A change in the gradient which is a substantial deviation from the preferred linear function will be considered to be indicative of an improperly performing tool 10. A "substantial" deviation can be determined experimentally.

In the preferred embodiment, the gradient calculation is used to determine when the rate of change of the cumulative percentage deviation data points exceeds some multiple of a minimum gradient previously observed, although other formulas could be utilized. The gradient calculation is done by maintaining a history of a known group size of the last group of data samples. This group will be constantly updated by adding the last sensed cumulative percentage deviation data point and dropping the oldest sensed cumulative percentage deviation data point in the group. The gradient of the cumulative percentage deviation signature will be computed for each group. The calculated gradient for a sensed interval will be checked against the minimum gradient previously observed, as at 51 in FIG. 4, and if the calculated gradient exceeds some multiple of the minimum gradient observed, as at 53 in FIG. 4, (preferably four (4) times the minimum gradient sensed) the tool will be determined to be worn to the point that it needs replacing. If the gradient for the particular sensed interval has not exceeded the said multiple of the minimum gradient observed, the gradient for the particular sensed interval will then be checked against the minimum gradient previously observed and, if smaller, will become the minimum gradient observed for future calculations.

In another embodiment, the gradient calculation is used to determine when the rate of change of the cumulative percentage deviation points does not exceed some fraction of a maximum gradient previously observed. The gradient calculation is done by maintaining a history of a known group size of the last data samples. The gradient of the cumulative percentage deviation signature may be computed for each interval by determining the difference between the current data value and the oldest data value in a group and dividing by the group size. The calculated gradient for the sensed interval will be checked against the maximum gradient previously observed and if the calculated gradient does not exceed some multiple, preferably a fraction, of the maximum gradient previously observed, the tool will be determined to be worn to the point that it needs replacing. If the gradient for the particular sensed interval has exceeded the said fraction of the maximum gradient observed, the gradient for the particular sensed interval will then be checked against the maximum gradient previously observed and, if larger, will become the maximum gradient observed for future calculations. The group of data samples will be constantly updated by dropping from the history of the data samples the oldest data value and adding the current data point in the logic 34.

The logic 34 also monitors the cumulative percentage deviation data points to determine if a preset maximum high cumulative percentage deviation data point is exceeded or a preset minimum low cumulative percentage deviation data point is not exceeded during each sensed increment. The high limit is indicated schematically in FIG. 4 at 52 and the low limit is indicated schematically at 54. If the cumulative percentage deviation signature 44 crosses the high limit 52 or crosses the low limit 54 during any cumulative percentage deviation cycle, a signal will be established at the output of logic 34 indicative of the fact that the high limit 52 has been exceeded or the fact that the low limit 54 exceeds an actual sensed cumulative percentage deviation data point which may be indicative of an improperly performing tool. It should be appreciated that the high and low limits 52, 54 will vary between machines and will be set experimentally. The limits 52, 54 illustrated are linear but other than linear functions could be utilized depending on the exact machining cycle.

The high 52 and low 54 limits can be utilized to provide a proper finish on the workpiece 14 as it is being machined. It has been found that if the cumulative percentage deviation signature is within the high 52 and low 54 limits then the proper finish can be maintained on the workpiece 14. The logic 34 can operate as an adaptive control to modify the feed rate between the tool 10 and workpiece 14 which has been found to modify the cumulative percentage deviation data point and the gradient of the cumulative percentage deviation signature. If the high limit 52 is exceeded the feed rate between the tool 10 and workpiece 14 could be decreased and if the low limit is not exceeded the feed rate between the tool 10 and workpiece 14 could be increased. This would tend to adjust the cumulative percentage deviation data points to hold them within the high 52 and low 54 limits. The logic 34 can operate so that at a high limit 52 or a low limit 54 the output signal on line 36 to drive 26 would be lowered by a predetermined amount during each cycle until the cumulative percentage deviation signature falls below the high limit 52, and raised by a predetermined amount during each cycle until the cumulative percentage deviation signature is above the low limit 54. This signal could be used to adjust the "feed rate" controller of the machine tool. The logic circuit 34 could limit the number of adjustments in the feed rate to a predetermined number and if the low limit is still not exceeded or the high limit is still exceeded then the machine could be shut down or a signal given to the operator indicative of the existing condition. Additionally, error limits can be set to shut the machine down in the event that the actual cumulative percentage deviation signature varies by a predetermined amount above the maximum or below the minimum set limits. While the feed rate is to decrease if high limit is exceeded and increase if below low limit as is common for most materials under certain material conditions, this feed change may be reversed to properly perform the proper function. It is thought that controlling the feed rate between the tool and workpiece controls the finish by eliminating or minimizing chatter between the tool and workpiece which results in better finish on the workpiece.

In addition, while the feed rate has been indicated as being modified it should be appreciated that the speed of the relative movement of the working tool 10 relative to the workpiece 14, either linearly or rotationally, could be modified with nearly identical results. Additionally, the depth of cut between the tool and workpiece could also be modified which would modify the volume of material removed from the workpiece per tooth or per revolution or linear movement. It is applicant 3 s intention that the modification of the feed rate shall also include modification of the relative speed of movement between the tool 10 and workpiece 14 or the depth of cut between the tool and workpiece.

Figure 5:
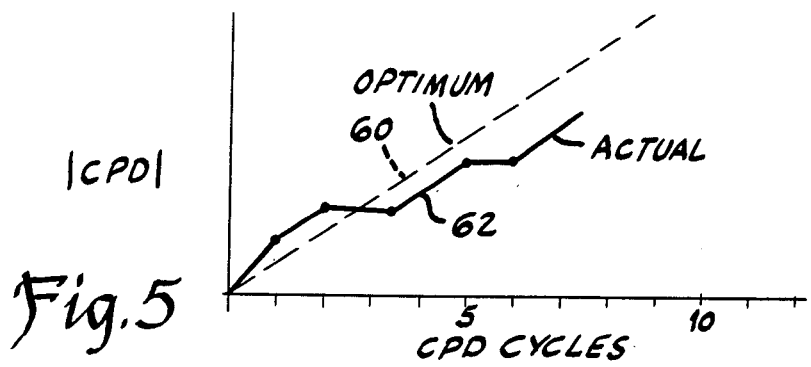
FIG. 5 is a graphical illustration of an established optimum cumulative percentage deviation absolute gradient and an actual cumulative percentage deviation signature and wherein the feed rate between the workpiece and tool has been varied to adjust the gradient of the actual sensed cumulative percentage deviation data points.

FIG. 5 discloses a preset optimum cumulative percentage deviation absolute gradient for a particular machining cycle. The gradient indicated at 60 in FIG. 5 is superimposed by an actual cumulative percentage deviation signature 62. The optimum cumulative percentage deviation absolute gradient 60 defines the optimum cumulative percentage devation gradient for a "good" machining cycle and will be set experimentally. The gradient of the actual cumulative percentage deviation signature 62 is controllable by utilizing the logic 34 to modify the feed rate (depth of cut, or linear or rotational relative movement) of the workpiece 14 relative to the tool 10. As the gradient of the actual cumulative percentage deviation data points 62 increases or decreases in such a manner that it does not follow or is not parallel to the optimum gradient 60 in FIG. 5, the logic 34 will either increase or decrease the feed rate between the workpiece 14 and the tool 10 to compensate for a wearing tool or possibly a soft or hard part that is being machined. The feed rate could be lowered or raised by a predetermined amount and corrected a predetermined number of times to attempt to make the gradient of the actual cumulative percentage deviation signature 62 equal to the optimum cumulative percentage deviation absolute gradient 60. If a predetermined number of corrections were made and the optimum cumulative percentage deviation gradient 60 was not equal to the gradient of the actual cumulative percentage deviation signature 62 then a signal could be established on line 36 indicative of a bad tool or to shut down the machine. A maximum and minimum feed rate could be established for each particular machine so that production speed does not become unmaintainable and if adjustment of the gradient of the actual signature 62 required exceeding the maximum feed rate or not exceeding the minimum feed rate then the logic 34 can establish a signal on line 36 to shut down drive 26. Additionally, an error limit could be provided to shut down the machine if the actual gradient of the cumulative percentage deviation signature varies by a predetermined amount from the optimum gradient.

Figure 7:
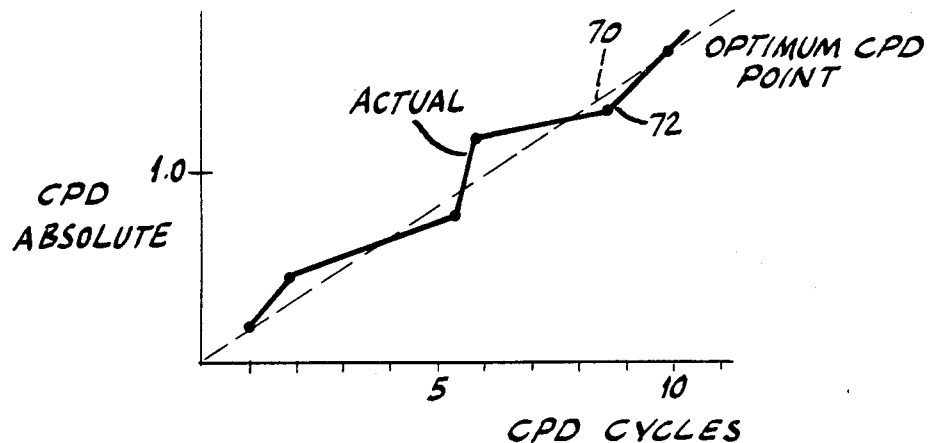
FIG. 7 is a graphical illustration of cumulative percentage deviation absolute vs. cumulative percentage deviation cycles showing an optimum cumulative percentage deviation reference wherein the feed rate between the workpiece and tool is varied to adjust the actual cumulative percentage deviation absolute data points.

FIG. 7 discloses a preset optimum cumulative percentage deviation absolute signature for a particular machining cycle. The optimum cumulative percentage deviation absolute signature is indicated at 70 and an actual cumulative percentage deviation signature at 72. The optimum cumulative percentage deviation absolute signature 70 defines the optimum cumulative percentage deviation data point for each cumulative percentage deviation cycle and may be set experimentally in dependence upon the exact machining cycle which is to be monitored. The actual signature 72 is controllable by connecting the logic 34 to the drive 26 to control the feed rate of the workpiece relative to the tool 10. As the actual cumulative percentage deviation data points increases or decreases from the optimum cumulative percentage deviation data point of signature 70, the logic 34 will either increase or decrease the feed rate (depth of cut, or linear or rotational relative movement) between the workpiece 14 and the tool 10 to compensate for a wearing tool or possibly a soft or hard part that is being machined. The feed rate could be lowered or raised by a predetermined amount and corrected a predetermined number of times to attempt to make the actual cumulative percentage deviation signature 72 follow the optimum cumulative percentage deviation signature 70. If a predetermined number of corrections were made and the optimum cumulative percentage deviation signature 70 was not followed by the actual cumulative percentage deviation signature 72, then a signal could be established on line 36 indicative of a bad tool or to shut down the machine. Additionally, a maximum and minimum feed rate could be established for each particular machine cycle and an error limit could be provided to shut down the machine or establish a signal on line 26 if the actual cumulative percentage deviation data point differs from the optimum cumulative percentage deviation data point by a predetermined amount.

Figure 8:
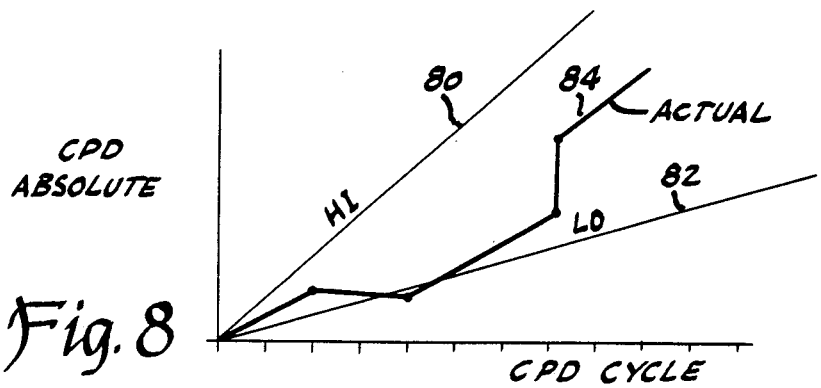
FIG. 8 is a graphical illustration of cumulative percentage deviation absolute vs. cumulative percentage deviation cycles showing a maximum and minimum gradient and varying the feed rate between the workpiece and tool to adjust the actual cumulative percentage deviation absolute data points.

FIG. 8 discloses a preset minimum and maximum cumulative percentage deviation gradient for a particular machining cycle which can be set experimentally. The high or maximum gradient is indicated at 80 and the low or minimum gradient is indicated at 82. The actual cumulative percentage deviation signature is shown at 84. The maximum and minimum gradients 80, 82 define the range of acceptable gradients for the cumulative percentage deviation signature for a "good" machining cycle. The gradient, as aforementioned, is controllable by connecting logic 34 to the drive 26 to control the feed rate (or relative movement or depth of cut) of the workpiece 14 relative to the tool 10. As the gradient of the actual cumulative percentage deviation data points 84 increases or decreases such that it exceeds the maximum gradient 80 or is less than the minimum gradient 82, the logic 34 will either increase or decrease the feed rate between the workpiece 14 and the tool 10. The feed rate could be corrected a predetermined number of times to attempt to keep the gradient of the actual cumulative percentage deviation signature 84 within the maximum and minimum gradients 80, 82. If a predetermined number of corrections were made and the actual cumulative percentage deviation signature was still not within the maximum and minimum limits or if the actual cumulative percentage deviation signature varied by a predetermined amount from the maximum or minimum limits, a signal could be established on line 36 indicative of a bad tool or to shut down the machine.

While the above mentioned methods for controlling the gradient of the cumulative percentage deviation signature and for controlling the cumulative percentage deviation data points have been described individually, it should be appreciated that combinations of these methods could be utilized to effectively sense an improperly performing tool.

From the foregoing should be apparent that a new and improved method of monitoring the performance of a cutting tool which rotates relative to a workpiece through a cycle has been provided. The method includes the steps of dividing the cycle into a plurality of increments sensing the torque or a function of force applied to the tool during the increments, determining the cumulative percentage deviation for each sensed increment of the cycle and determining a cumulative percentage deviation data point for each sensed individual increment. The method additionally includes the steps of establishing a reference for the cumulative percentage deviation data points for each of the sensed increments and comparing the actual determined sensed cumulative percentage deviation data point with the established reference for the cumulative percentage deviation data point. A first signal is generated if the actual determined cumulative percentage deviation data point for a particular increment deviates from the established reference for that particular increment and the feed rate between the tool and the workpiece is modified in dependence on the first signal.

What we claim is:

1. A method of monitoring the performance of a tool which moves relative to a workpiece through a cycle and controlling the feed rate between the tool and workpiece in response to the monitored performance of the tool comprising the steps of:
dividing said cycle into a plurality of increments:

2. A method of monitoring the performance of a tool which moves relative to a workpiece through a cycle as defined in claim 1 when said step of establishing a reference for the mathematically smoothed function of force includes the step of:
establish an acceptable range for the determined mathematically smoothed function of force for each sensed individual increment.

3. A method of monitoring the performance of a tool which moves relative to a workpiece through a cycle as defined in claim 2 wherein said step of establishing an acceptable range for the mathematically smoothed function of force includes the step of establishing a high limit for the mathematically smoothed function of force and a low limit for the mathematically smoothed function of force for each sensed increment.

4. A method of monitoring the performance of a tool which moves relative to a workpiece through a cycle as defined in claim 1 wherein said step of establishing a reference for the mathematically smoothed function of force includes the step of;
establishing an optimum mathematically smoothed function of force for each sensed individual increment.

5. A method of monitoring the performance of a tool which moves relative to a workpiece through a cycle as defined in claim 1 wherein said step of establishing a reference for the mathematically smoothed function of force includes the step of;
establishing an optimum acceptable range for the gradient of the mathematically smoothed function of force.
sensing a function of the force applied to said tool during said increments;
determining a mathematically smoothed function of force for said sensed function of force for each sensed individual increment of said cycle;
establishing a reference for the mathematically smoothed function of force for each of said sensed increments;
comparing said determined mathematically smoothed function of force for a particular sensed increment with said established reference for that particular increment;
generating a first signal if said actual determined mathematically smoothed function of force for a particular increment deviates from the established reference for that particular increment; and
modifying the feed rate between the tool and workpiece in dependence on said first signal.

6. A method of monitoring the performance of a tool which moves relative to a workpiece through a cycle as defined in claim 5 wherein said step of establishing an acceptable range for the gradient of the mathematically smoothed function of force includes the step of establishing a maximum gradient for the mathematically smoothed function of force and a minimum gradient for the mathematically smoothed function of force for each sensed increment.

7. A method of monitoring the performance of a tool which moves relative to a workpiece through a cycle as defined in claim 1 wherein said step of establishing a reference for the mathematically smoothed function of force includes the step of;
establishing an optimum gradient for the mathematically smoothed function of force.

8. A method of monitoring the performance of a tool which moves relative to a workpiece through a cycle as defined in claim 1 wherein said step of generating said first signal comprises the step of generating a first signal only if the deviation between the actual determined mathematically smoothed function of force and the established reference for the mathematically smoothed function of force is of a predetermined magnitude for a particular increment.

9. A method of monitoring the performance of a tool which moves relative to a workpiece through a cycle as defined in claim 1 wherein said first signal has a first characteristic when said actual determined mathematically smoothed function of force for a particular increment is less than said established reference for the mathematically smoothed function of force for that particular increment and said first signal has a second characteristic when said actual determined mathematically smoothed function of force for a particular increment is greater than said established reference for the mathematically smoothed function of force for that particular increment.

10. A method of monitoring the performance of a tool which moves relative to a workpiece through a cycle as defined in claim 9 further including the steps of:
modifying the feed rate between said cutting tool and workpiece in a first sense in response to a first signal having said first characteristic; and
modifying the feed rate between said cutting tool and said workpiece in a second sense, opposite said first sense, in response to a first signal having said second characteristic.

11. A method of monitoring the performance of a tool which moves relative to a workpiece through a cycle as defined in claim 9 wherein said step of modifying the feed rate in response to a first signal having said first characteristic includes the step of increasing the feed rate between said cutting tool and workpiece and said step of modifying the feed rate in response to a first signal having said second characteristics including the step of decreasing the feed rate between said tool and workpiece.

12. A method of monitoring the performance of a tool which moves relative to a workpiece through a cycle as defined in claim 1 wherein said step of modifying the feed rate includes the step of terminating the cycle between the tool and workpiece in response to the generation of said first signal.

13. A method of monitoring the performance of a tool which moves relative to a workpiece through a cycle as defined in claim 1 wherein said step of sensing a function of the force applied to said tool includes the step of sensing the torque applied to said tool.

14. A method of monitoring the performance of a tool which moves relative to a workpiece through a cycle as defined in claim 1 wherein said step of sensing a function of the force applied to said tool includes the step of sensing the thrust applied to said tool.

15. A method of monitoring the performance of a tool which moves relative to a workpiece through a cycle as defined in claim 1 wherein said step of sensing a function of the force applied to said tool includes the step of sensing the separation force applied to said tool.

16. A method of monitoring the performance of a tool which moves relative to a workpiece through a cycle as defined in claim 1 wherein said step of sensing a function of the force applied to said tool includes the step of sensing the feed force applied to said tool.

17. A method of monitoring the performance of a tool which moves relative to a workpiece through a cycle as defined in claim 1 wherein said step of modifying the feed rate between said tool and said workpiece operates to maintain a proper finish on said workpiece.

18. A method of monitoring the performance of a tool which moves relative to a workpiece through a cycle and controlling the feed rate between the tool and workpiece in response to the monitored performance of the tool comprising the steps of:
dividing said cycle into a plurality of increments:
sensing a function of the force applied to said tool during said increments;
determining a mathematically smoothed function of force for said sensed function of force for each sensed individual increment of said cycle;
establishing a reference for the mathematically smoothed function of force for each of said sensed increments;
comparing said determined mathematically smoothed function of force for a particular sensed increment with said established reference for that particular increment;
generating a first signal if said actual determined mathematically smoothed function of force for a particular increment deviates from the established reference for that particular increment; and
modifying the feed rate between the tool and workpiece in dependence on said first signal;
wherein said step of determining a mathematically smoothed function of force for the sensed function of force includes the steps of determining the cumulative percentage deviation for the sensed function of force for each sensed individual increment of said cycle;
and determining a cumulative percentage deviation data point for each sensed individual increment.

19. A method of monitoring the performance of a tool which moves relative to a workpiece through a cycle as defined in claim 18 wherein said step of establishing a reference for the mathematically smoothed function of force comprises establishing a reference for the cumulative percentage deviation data point for each of said sensed increments.

20. A method of monitoring the performance of a tool which moves relative to a workpiece through a cycle as defined in claim 19 wherein said step of establishing a reference for the cumulative percentage deviation data point includes the step of;
establishing an optimum cumulative percentage deviation data point for each sensed individual increment.

21. A method of monitoring the performance of a tool which moves relative to a workpiece through a cycle as defined in claim 20 wherein said step of determining a cumulative percentage deviation data point for a particular increment includes the step of adding the absolute value of the percentage deviation for that particular increment to the sum of the absolute values of the sensed percentage deviation for the previously sensed increments.

22. A method of monitoring the performance of a tool which moves relative to a workpiece through a cycle as defined in claim 19 wherein said step of establishing a reference for cumulative percentage deviation data point includes the step of;
establishing an optimum acceptable range for the gradient of the cumulative percentage deviation data points.

23. A method of monitoring the performance of a tool which moves relative to a workpiece through a cycle as defined in claim 22 wherein said step of establishing an acceptable range for the gradient of the cumulative percentage deviation data points includes the step of establishing a maximum gradient for the cumulative percentage deviation data points and a minimum gradient for the cumulative percentage deviation data points for each sensed increment.

24. A method of monitoring the performance of a tool which moves relative to a workpiece through a cycle as defined in claim 19 wherein said step of establishing a reference for cumulative percentage deviation data point includes the step of;
establishing an optimum gradient for the cumulative percentage deviation data points.

25. A method of monitoring the performance of a tool which moves relative to a workpiece through a cycle as defined in claim 19 wherein said step of generating said first signal comprises the step of generating a first signal only if the deviation between the actual determined cumulative percentage deviation data point and the established reference for the cumulative percentage deviation data point is of a predetermined magnitude for a particular increment.

26. A method of monitoring the performance of a tool which moves relative to a workpiece through a cycle as defined in claim 19 wherein said first signal has a first characteristic when said actual determined cumulative percentage deviation data point for a particular increment is less than said established reference for the cumulative percentage deviation data point for that particular increment and said first signal has a second characteristic when said actual determined cumulative percentage deviation data point for a particular increment is greater than said established reference for the cumulative percentage deviation data point for that particular increment.

27. A method of monitoring the performance of a tool which moves relative to a workpiece through a cycle as defined in claim 26 including the steps of:
modifying the feed rate between said cutting tool and workpiece in a first sense in response to a first signal having said first characteristic; and modifying the feed rate between said cutting tool and said workpiece in a second sense, opposite said first sense, in response to a first signal having said second characteristic.

28. A method of monitoring the performance of a tool which moves relative to a workpiece through a cycle as defined in claim 26 wherein said step of modifying the feed rate in response to a first signal having said first characteristic includes the step of increasing the feed rate between said cutting tool and workpiece and said step of modifying the feed rate in response to a first signal having said second charateristics including the step of decreasing the feed rate between said tool and workpiece.

29. A method of monitoring the performance of a tool which moves relative to a workpiece through a cycle as defined in claim 18 when said step of establishing a reference for the cumulative percentage deviation data point includes the step of:

establishing an acceptable range for the determined cumulative percentage deviation data point for each sensed individual increment.

30. A method of monitoring the performance of a tool which moves relative to a workpiece through a cycle as defined in claim 29 wherein said step of establishing an acceptable range for the determined cumulative percentage deviation data points includes the step of establishing a high limit cumulative percentage deviation data point and a low limit cumulative percentage deviation data point for each sensed increment.

* * * * *

UNITED STATES PATENT AND TRADEMARK OFFICE
CERTIFICATE OF CORRECTION

PATENT NO. : 4,564,910
DATED : January 14, 1986
INVENTOR(S) : Stanley K. Smith; Donald J. Rozsi It is certified that error appears in the above-identified patent and that said Letters Patent are hereby corrected as shown below:

Col. 11, Claim 1, after line 26, please add--------- sensing a function of the force applied to said tool during said increments;

determining a mathematically smoothed function of force for said sensed function of force for each sensed individual increment of said cycle;

establishing a reference for the mathematically smoothed function of force for each of said sensed increments;

comparing said determined mathematically smoothed function of force for a particular sensed increment with said established reference for that particular increment;

generating a first signal if said actual determined mathematically smoothed function of force for a particular increment deviates from the established reference for that particular increment; and modifying the feed rate between the tool and workpiece in dependence on said first signal.-------

UNITED STATES PATENT AND TRADEMARK OFFICE
CERTIFICATE OF CORRECTION

PATENT NO. : 4,564,910

DATED : January 14, 1986

INVENTOR(S) : Stanley K. Smith; Donald J. Rozsi

It is certified that error appears in the above-identified patent and that said Letters Patent is hereby corrected as shown below:

Col. 11, Claim 5, line 58, delete lines 58 to 67.

Col. 12, delete first 8 lines.

Signed and Sealed this

Thirtieth Day of December, 1986

Attest:

DONALD J. QUIGG

*Attesting Officer*     *Commissioner of Patents and Trademarks*